United States Patent [19]

Hunter

[11] Patent Number: 4,848,674
[45] Date of Patent: Jul. 18, 1989

[54] METHOD FOR WASTE PAPER PULPING

[76] Inventor: A. Bruce Hunter, 18 Westpark Blvd., Dollard des Ormeaux, Montreal, Canada, H9A 2J6

[21] Appl. No.: 208,663

[22] Filed: Jun. 20, 1988

[51] Int. Cl.$^4$ .............................................. B02C 13/00
[52] U.S. Cl. ........................................ 241/16; 241/20; 241/21
[58] Field of Search ................ 241/15, 16, 20, 21, 241/24, 28, 46 R, 46 B, 46.11, 46.17, 79, 80, 81; 209/250, 358

[56] References Cited

U.S. PATENT DOCUMENTS

| | | | |
|---|---|---|---|
| 3,565,350 | 2/1971 | Coms et al. | 241/46.17 X |
| 3,784,116 | 1/1974 | Buckman et al. | 241/46.17 X |
| 3,844,488 | 10/1974 | Neitzel . | |
| 4,017,033 | 4/1977 | Tea | 241/46.17 X |
| 4,030,671 | 6/1977 | Couture . | |
| 4,129,259 | 12/1978 | Vokes . | |
| 4,219,381 | 8/1980 | Schnell . | |
| 4,272,315 | 6/1981 | Espenmiller . | |
| 4,443,296 | 4/1984 | Lamort . | |
| 4,592,513 | 6/1986 | Musselmann et al. . | |
| 4,620,671 | 11/1986 | Skaar . | |
| 4,622,099 | 11/1986 | Eelman | 741/46.17 X |

Primary Examiner—Timothy V. Eley

[57] ABSTRACT

Paper making pulp stock being processed in a pulper is caused to flow through an auxiliary passageway from the main body of the pulper tub and back to the pulper tub at the downstream end of the passageway, propelled solely by the fluid dynamics of the vortical circulation in the pulper. The stock is first caused to flow through a diverging section of the passageway, whereby its velocity along the passageway is caused to decelerate, thence to a section of relatively large cross-section, where the velocity of the stock is low, and gravity classification takes place, and thence to a converging section of the passageway where its velocity is caused to accelerate before re-entering the main pulper tub. In its progress through the auxiliary passageway the fluid energy of the moving pulp stock is converted from largely velocity energy to largely pressure energy, or head, in the diverging section and then from largely pressure energy to largely velocity energy in the converging section of the passageway, according to the well-known Bernouilli equation in fluid mechanics. In the section of large cross-section, the heavy contaminants settle to the bottom, and the light weight contaminants rise to the top. The heavy and light weight contaminants are separately removed. The method may be performed efficiently, both in pulpers having a rotor mounted on a vertical shaft, and in pulpers having a rotor mounted on a horizontal shaft.

13 Claims, 5 Drawing Sheets

METHOD FOR WASTE PAPER PULPING

FIELD OF THE INVENTION

The preparation of secondary fibre for papermaking and paperboard making, often referred to as the recycling of waste paper, has been practiced in many countries for many years. The use of recycled paper fibres has increased steadily, year by year. It seems apparent that this trend will continue, and that increasing amounts of secondary pulp will be produced in the future, with the increasing per capita annual use of paper and paper products throughout the world, and as the world's forests become depleted.

Waste paper for recycling is usually received by the mill in bales, and these bales of wastepaper have always contained some contaminating tramp material. It is a generally held view in the industry that the amount of contaminants has been increasing steadily over the years. It seems likely that the trend may continue, and the quality may get worse as time goes on.

The removal of such contaminants is a critical part of the stock preparation operation. The contaminants found are of three general types. First, there is elongated flexible material, fabrics, pieces of cord, lengths of wire, metal bale strapping, and the like, which it is well known to remove with a ragger. There is heavy material, usually called junk, including pieces of metal, stones and the like, usually removed with junk traps or junk boots of various known designs. Finally, there is light weight material, largely composed of plastics of various types, but also including pieces of wood and other materials. By light weight material is meant any particles or pieces of materials which would eventually float to the surface of a container of stock which was not agitated. Various approaches to the removal of this type of material have been suggested, including, inter alia, Couture, with U.S. Pat. No. 4,030,671, and Vokes, with U.S. Pat. No. 4,129,259.

BACKGROUND OF THE INVENTION

The usual first step in the preparation of secondary fibre stock from wastepaper is ordinarily carried out in a device called a pulper. The wastepaper is placed, together with a quantity of water, in an open-topped container called a pulper vat or pulper tub. It is then subject to the action of an impeller or rotor, mounted on and revolving with a shaft. Vigorous agitation of the liquid is produced, and, partly due to the fluid turbulence and fluid shear, and partly due to mechanical impact and abrasion from the rotor, the pieces of wastepaper are separated into their component fibres.

Pulpers in general use in the industry can be considered as divided into two general groups, those with the rotor mounted on a vertical shaft, and those with the rotor mounted on a horizontal shaft.

In the vertical shaft type, the tub usually takes the form of an open-topped cylinder with a vertical axis, and having a generally horizontal bottom, the whole supported on a suitable frame. Although the circular, or cylindrical tub is most common, lobed tubs of more or less clover-leaf shape are in use, square tubs are known, and various geometrical shapes are possible. Although the bottom is generally flat, a large radius curved fairing may connect the bottom with the sides, or there may be a frustoconical section of the lower side wall, joining with a circular horizontal center section of the bottom.

The rotor shaft, supported on suitable bearings, and driven by a suitable motor and drive, enters the tub axially from the bottom, through a suitable shaft seal or stuffing box.

The rotor itself is equipped with blades or vanes, usually backward-curved, with a general appearance somewhat resembling the impeller of a centrifugal pump, although not equipped with the front or back shrouds common on pump impellers.

The action of the rotor causes a primary circulation of the water, stock, and as-yet-unpulped paper in the tub which is in the form of a strong vortex about the axis of the cylindrical tub. A secondary circulation, well known in hydrodynamics in vertical flow regimes, is induced. This secondary circulation flows upwardly near the tub walls, radially inward near the surface, downward in the center toward the center of the rotor, i.e. toward the eye of the impeller, in the centrifugal pump analogy, and outward toward the walls near and between the rotor vanes.

It is common to provide a plurality of fixed guide vanes, usually angled upward in the flow direction, fastened to the lower part of the tub wall. Their purpose is to augment and direct the secondary flow, so that there is a strong downward current toward the center of the rotor, with the intent of bringing as-yet-unpulped paper downward into contact with the rotor more quickly. It is also known to mount a corkscrew-like device to the top of the rotor, intended to pull unpulped paper down into contact with the rotor.

It is usual to provide extraction plates, by which is meant an area in the bottom of the tub, usually underneath the rotor, which is covered by plates having a plurality of rather small holes, whereby the processed pulp stock is withdrawn from the pulper tub. Passing through the extraction holes, the stock passes to a closed extraction chamber usually of annular shape beneath the tub bottom. From there it is withdrawn through a pipe with a valve, usually by means of a pump, and sent to further processing.

Pulpers with a rotor mounted on a horizontal shaft, often spoken of as side-entry pulpers, have the rotor revolving in a vertical plane at one end of the tub. The tub usually has the form of a cylinder with a horizontal axis, with a cut-out area at the top, usually surrounded by short vertical sides. The extraction plates are vertical, behind the rotor, and an extraction chamber behind that.

Pulpers are spoken of as being either batch pulpers or continuous pulpers, although this refers more to their operating cycle than it does to any specific features of design or construction, with the possible exception of the size of the holes in the extraction plates.

In batch operation, the pulper is filled to its operating level with water or whitewater, by which is meant recycled water from mill operations, usually from thickeners, which contains a small concentration of fibres and fines. Wastepaper is added, normally in the form of bales. The pulper is operated for some length of time, following which the valve in the pipe from the extraction chamber is opened, the pump is placed in operation, and stock is withdrawn from the pulper through the extraction plates. It is not usual to attempt to empty the pulper completely at this point, particularly as there may remain pieces of paper which are as yet unpulped, and would not pass through the holes in the extraction plates. The stock in the pulper is extracted until the level falls substantially, and then the valve is closed again. The pulper is then refilled to operating level with water or whitewater, and more baled wastepaper is added. It is usual to leave the pulper rotor rotating at all times, that is, during extraction and refilling etc.

In continuous operation, the extraction valve is left open, and the extraction pump left running continuously, or at least for a substantial part of the time. Water or whitewater is added continuously, or at short intervals, to maintain the operating level at all times. Wastepaper is added in smaller quantities at relatively short intervals, to maintain a relatively uniform consistency, or concentration of pulp fibres in water, at all times.

What has been stated about wastepaper also applies to waste cardboard, or waste corrugated containers, all of which are used as furnish for secondary fibre paper and paperboard making operations.

It may be remarked here that, in a vertical shaft pulper, the vortical circulation is strong enough that the liquid surface of the circulating stock is not level, but exhibits a deep depression in the center of the vortex.

The wastepaper as received by the mill contains undesirable contaminants. Some observers have estimated that wastepaper received by United States mills contains, on the average, 15% by weight of contaminants.

Elongated material, including lengths of wire, lengths of steel strapping, lengths of rope or cord, and pieces of fabric, can be removed readily by a ragger. Ragger design has become pretty well standardized in most mills. It consists simply of a rope of rather large diameter, suspended from a winch, with the winch mounted near and somewhat above the top of the vertical side of the pulper, and the free end of the rope trailing in the stock of the vortex. The elongated material eventually becomes tightly wound around the rope, due to the action of the vortex, and can be removed from the pulper using the winch.

Heavy contaminant material, including nuts, bolts, metal parts, stones and the like, is often called junk in the industry. It is usually removed from the pulper by devices variously called junkers, junk towers, or junk boots. There are a variety of designs which have been used or proposed. What they have in common is an opening in the lower part of the pulper tub sidewall, at the bottom or somewhat above the bottom. The opening is connected by a connecting sleeve, or a chute or a slide to a chamber external to the pulper tub, which, in the common junk tower type of design, is square or rectangular in horizontal cross-section, and which extends vertically from somewhat below the pulper bottom to somewhat above the top of the pulper side wall. It is closed at the bottom, and open to atmosphere at the top.

In operation, a piece of junk, under the action of the rotating rotor, or driven by the strong vortical fluid flow, will move in generally circular motion on or near the tub bottom. When it reaches the opening, it will pass through it due to centrifugal force, and come to rest on the bottom of the junk tower. From there, the accumulated junk can be removed by using a clam-shell or orange-peel grapple, suspended from an overhead electric hoist, which can be lowered into the junk tower with its jaws or claws opened, then closed around the junk, and hoisted out. If the suspending hoist is mounted on an overhead trolley or a swinging gantry, it can then be dumped into a removable bin or container, which can later be trucked away to disposal. Alternatively, bucket elevator type devices are used, having a plurality of buckets mounted on a pair of endless chains, running over sprockets from the bottom of the tower, where they pick up junk, to the top where they dump into a container. Other means for junk removal from the tower have been used.

There is no flow of stock through the opening into the junk tower. The liquid level or stock level in the top of the tower will be above the stock level in the pulper tub, since the velocity head of the flowing liquid in the vortex at the opening, is converted to increased static head of the motionless liquid at the top of the tower, in accordance with the Bernouilli equation. Couture, in U.S. Pat. No. 4,030,671, using somewhat different language, points this out in his "Background of the Invention" section, where he says: ". . . the normal operation of a pulper rotor tends to force sufficient liquid from the tub to the junk remover when the pulping operation commences to maintain a higher static head in the junk remover than in the tub, commonly of the order of 12 inches." (Col. 1, lines 34–38). Vokes, in U.S. Pat. No. 4,129,259 using very similar language to Couture, says, under "Background of the Invention": ". . . the normal operation of a pulper rotor tends to force sufficient liquid from the tub to the junk remover when the pulping operation commences to maintain a higher static head in the junk remover than in the tub, commonly of the order of two or more feet." (Col. 1, lines 33–36).

Light weight contaminants are a particular problem in the pulping of waste paper. These include pieces of wood and the like, but mainly include plastics of various types and chemical compositions, of various sizes and in sheet, film, or foam form. The proportion of plastic contained in wastepaper seems to be increasing every year. Plastic sheet, or film, in the pulper does not readily disintegrate, as does paper or paperboard. The result is that it tends to accumulate in the pulper tub, from batch to batch in batch pulping, or progressively as the pulping operation is continued, in continuous pulping. As this goes on, the pulper's ability to defiber paper is reduced, until the throughput through the extraction plate is only a fraction of what it had been. The pulper is then sometimes said to be "constipated." One possible remedy is to shut down, drain the pulper, and manually remove the accumulated plastic. This is expensive, and time consuming.

Some comments on styrofoam may be appropriate here. Styrofoam is very common in baled wastepaper. There would scarcely be a bale to be found without a few crushed styrofoam coffee cups. Also, larger chunks of styrofoam, such as the sort of shaped blocks used to pack cameras or instruments for shipment, are very common among wastepaper. Since styrofoam is very light weight, a block of styrofoam is very buoyant, and will float high in water or stock. It is not unusual to see a large block of styrofoam in a pulper, where it tends to go near the center of the vortex, and the same block can sometimes be seen circling there for half an hour.

Sooner or later, of course, the block of styrofoam is caught by the strong turbulence in the center of the vortex, and entrained in the downward part of the secondary circulation, until it is struck by the rotor. Unlike sheet and film plastic, the styrofoam is quite friable, and when struck by the rotor will disintegrate into a number of smaller pieces. The smaller pieces, of course, are more readily entrained by the flow, strike the rotor again, and break down to smaller and smaller pieces. The result is that styrofoam is broken down to pieces of small enough size to pass through the holes in the extractor plate with the stock leaving the pulper. It is usual to pass the pulped stock through screens, which will remove much of the broken down styrofoam, and then through reverse cleaners, which will remove still more. However, where very small particles of styrofoam are concerned, it must be appreciated that pulp screens, or centrifugal separating devices like reverse cleaners operate only on a sort of statistical probability basis, and cannot be guaranteed to remove every particle. When such particle reaches the paper machine, it is incorporated into the sheet. When it passes through the calender stack, the piece of styrofoam is compressed, but then springs back, resulting in a very undesirable raised defect in the sheet, often called a "pimple" in the sheet. On examination, it will be found to contain a small encapsulated piece of styrofoam.

SUMMARY OF THE INVENTION

The invention consists of a method of removing contaminants from a rotating main body of liquid containing paper pulp in suspension, said method comprising (a) diverting a subsidiary stream of said liquid from said main body, (b) expanding the transverse cross-section of said diverted stream to reduce its velocity to cause heavy contaminants in the reduced-velocity stream to sink and light contaminants to rise, (c) subsequently contracting the transverse cross-section of the previously expanded stream to increase its velocity, and (d) returning such increased-velocity stream to the main body, (e) said diverting and returning steps utilising energy from such rotation to induce flow of the subsidiary stream.

The invention also consists of a waste paper pulper comprising (a) a tub for containing a liquid with paper pulp in suspension, (b) an impeller in said tub for generating a rotary circulation of said liquid in the tub, and (c) a passageway having inlet and outlet openings at respective ends, said openings each communicating with said tub for conveying a subsidiary stream of the liquid from the tub and returning said stream to the tub, (d) said passageway extending from said inlet opening, through a divergent section, a central section and finally a convergent section to said outlet opening.

The apparatus preferably includes a passageway external to the pulper tub, having a first opening whereby stock from the pulper enters the passageway, and a second opening remote from the first opening whereby stock from the passageway re-enters the pulper. The walls of the passageway can be so designed and constructed, and have such relative dimensions and spatial relationships that the objects of the invention are achieved, namely, the separation of heavy junk into one region, and its separate removal, and the removal of light contaminants including plastic and styrofoam in another region, and its separate removal.

The connections to the tub at the first and second openings are preferably tangential, and so arranged that the flow dynamics of the vortical flow in the pulper provides a strong, continuous circulation of stock through the passageway.

The passageway can be divided into three regions, with the first region, that is, the region nearest the inlet opening being closed, with the second region being open to atmosphere at the top, and with the third region being closed.

In the preferred embodiment of the invention, the first region comprises a divergent passageway, where the stock entering from the first opening is decelerated from the high initial velocity of the vortical flow in the pulper to a low velocity. This is accompanied by the conversion of velocity head to static head, according to the Bernouilli equation. More important, the lowered velocity and reduced turbulence reduce the entrainment effect on contaminants, permitting the effect of gravity to move heavy junk toward the bottom of the passageway, and the effect of buoyancy to move light contaminants toward the top of the passageway. The bottom of this portion of the passageway is sloped downward in the flow direction, assisting heavy junk to slide or roll downhill toward the junk pocket in the bottom of the second region, while, of course, being propelled by the flowing stock. The top of this portion of the passageway is sloped upward in the flow direction, assisting the buoyant light weight contaminants, including styrofoam, to move upward and along, while propelled by the flow of stock, toward the collection region for light weight material, which is at the liquid surface at the top of the center region.

The center or second region is of greatly increased cross-section, in a direction perpendicular to the general flow direction. It contains a junk pocket at the bottom, and a collection region for light contaminants at the top. The large dimensions are such that the flow velocity here is low, permitting heavy junk to fall due to gravity, and light material to rise due to buoyancy. Means are described to remove the junk from the junk pocket. Means are also described to remove the floating light contaminants.

The third section of the passageway is a converging section, wherein the velocity of the flowing stock is accelerated, and static head is converted back to velocity head, again, according to the Bernouilli equation. It will be noted, of course, that the conversion from velocity head to static head, and back again, will not be completely efficient, due to fluid friction and losses from turbulence. However, a strong flow is maintained, since the first opening is at or near the tub bottom, where the stock entering the passageway has its greatest energy level, having just left the rotor. The second opening is at a higher level in the tub wall, although still below the normal operating liquid level in the pulper, and thus at a point where the stock is at a lower energy level. The arrangement of tangential inlet and outlet to the passageway assists, of course, since positive stagnation pressure at the inlet to the passage, and negative stagnation pressure at the outlet, are utilized.

Shower means, and dilution water means are disclosed, to minimize any loss of good fibre with either the heavy or light contaminants.

Examination of the Couture and Vokes patents shows clearly that both Couture and Vokes began with a junk tower with a bucket elevator, long used in the industry to deal with heavy contaminants, and worked to adapt it to deal with light contaminants as well. They were both faced with the problem of getting some reliable flow of stock through the opening from the pulper tub to the junk tower, to transport the light contaminants. Couture, in U.S. Pat. No. 4,030,671 teaches the use of a pump to remove stock from near the top of the tower. He says: ". . . maintaining the liquid level in the junk remover lower than in the pulper tub and thereby inducing liquid flow from the tub into the junk remover. In the practice of the invention this is done by connecting the inlet of a pump to the junk remover casing at a level below the minimum operating level in the tub, and withdrawing liquid from the junk remover and recirculating it back to the tub under controlled conditions establishing the desired lowered liquid level in the junk remover than in the tub, e.g lower by about a few inches." (Col. 2 lines 8-18)

Vokes, in U.S. Pat. No. 4,129,259 teaches that, rather than using the pump of Couture, the flow may be induced, by, so to speak, bailing some stock out of the tower, using the buckets of the bucket elevator. He says: ". . . One of these ways of effecting the desired recirculation is by overflow from the junk box in the top of the junk remover tower with this overflow liquid being recycled directly to the tub . . . " (Col. 3 lines 41-45). Vokes also speaks of: ". . . a two-way flow of liquid through the chute 35, i.e. trash-carrying liquid impelled by the rotor into the junk remover and relatively solids-free return flow into the pulper tub." (Col. 4, lines 64-67). Vokes does not disclose any means whereby two different flows, in opposite directions, through a single opening can be caused or controlled.

By contrast, with the prior art, the present invention has been conceived and designed to simultaneously remove light contaminants and heavy contaminants, to remove them with separate means into separate receptacles, which will prove convenient, as they are advantageously disposed of separately, and to do so without the need for additional equipment such as pumps or the like.

BRIEF DESCRIPTION OF THE DRAWINGS

In the figures, like numerals of reference denote like parts in the various figures.

DETAILED DESCRIPTION OF THE EMBODIMENTS

Figure 1:
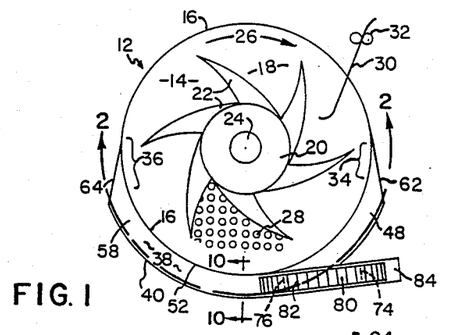
FIG. 1 is a plan view of a pulper with a vertical shaft, incorporating a preferred embodiment of the invention.
Figure 2:
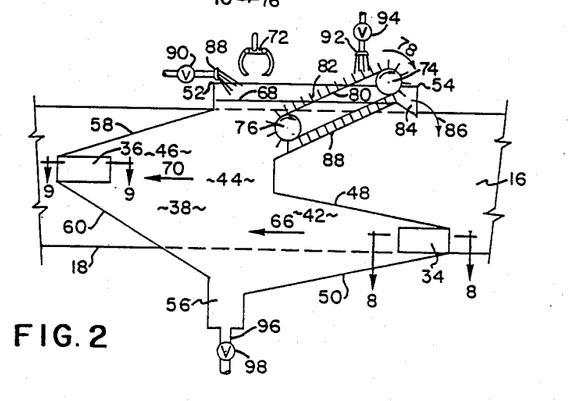
FIG. 2 is a partial vertical section, in development, of the embodiment of FIG. 1, taken generally along the arcuate line 2—2 in FIG. 1, but showing some parts in elevation for clarity.

Referring to FIGS. 1 and 2, a pulper 12 has a pulper tub 14, which includes a generally cylindrical open-topped side wall 16, and a generally horizontal pulper bottom 18. It is equipped with a rotor 20, which rotor includes a plurality of blades or vanes 22. The rotor is rotatably mounted on, fixed to, and driven by a shaft with a vertical axis 24. The shaft passes through the pulper bottom 18 through a suitable packing gland or shaft seal, not shown. The shaft is supported on suitable bearings, not shown, located below the pulper bottom 18, and is driven by a suitable motor and drive (not shown) so that rotor 20 rotates in the sense shown by the arrow 26.

A portion of pulper bottom 18 is composed of extractor plates, which extractor plates have a plurality of small holes. These holes are shown diagrammatically as 28 in FIG. 1. Below the extractor plates is provided an extraction chamber, of annular shape surrounding the shaft, into which pulped stock can pass through the holes of the extractor plate. From the extraction chamber, the stock can be withdrawn by a pump, through a pipe with a valve, and sent to further processing. The extraction chamber, the pipe, the valve, and the pump are all not shown in the figures, being all well known in the industry. They may be of any suitable known design.

The pulper 12 is equipped with a ragger of known design, comprising a rope 30 supported by a winch 32.

Two openings are provided in pulper wall 16, with a passageway external to the pulper tub connecting them. The first opening is an inlet (meaning inlet to the passageway) opening 34, located at or slightly above pulper bottom 18. The second opening is an outlet (from the passageway) opening 36, which is remote from opening 34, and which is located at a higher level than the opening 34, although below the operating level of the stock in the pulper tub.

The passageway 38 is arcuate in shape, in this embodiment, following the cylindrical wall 16 of the pulper tub. Advantageously, the wall 16 may form the radially inner wall of the arcuate passageway, as shown in FIG. 1. The radially outer wall 40 of the passageway is irregular in shape in the elevational view shown in FIG. 2, but, as shown in the plan view of FIG. 1, it follows the arc of a circle, radially uniformly spaced from pulper wall 16.

The passageway 38 can be considered to be divided into three regions, a divergent section 42, a central section 44, and a convergent section 46. The divergent section 42 is closed at the top by a top plate 48, upwardly sloped in the flow direction, and a bottom plate 50, downwardly sloped in the flow direction.

The central section 44 extends vertically farther than the other two sections, and is open to the atmosphere at the top from an edge 52 to an outwardly extended end 54. The central section 44 is closed at the bottom by a junk pocket 56.

The convergent section 46 is closed by a top plate 58, downwardly sloped in the flow direction, and a bottom plate 60, which is upwardly sloped in the flow direction.

The ends of the passageway are closed, as best seen in FIG. 1, by an end plate 62, which is tangentially disposed to the pulper wall 16, adjacent to opening 34, and by end plate 64, adjacent to opening 36, and also tangentially disposed to wall 16.

In operation, the rotation of the rotor 20 in the direction shown by arrow 26 causes a strong vortical circulation of stock in the pulper, also in the direction shown by arrow 26. The moving stock has sufficient velocity and turbulence that both heavy contaminants, and light, or floatable, contaminants are entrained in it. At the opening 34, a portion of the circulating stock, carrying with it both heavy and light contaminants, enters opening 34, propelled by the velocity head, and by centrifugal force. The stock enters tangentially, along tangential end plate 62.

The stock then flows through divergent section 42, as generally depicted by flow arrow 66. Due to the divergence of the passageway, it is decelerated to a lower velocity. This means that the entrainment effect of high velocity flow is reduced. Thus the heavy contaminants tend to fall toward bottom plate 50, and when they reach it, they slide or roll down the slope, propelled by the flow of the stock, and come to rest in the junk pocket 56. Similarly, as the stock slows down, the entrainment effect on the light contaminants is reduced, so that they tend to rise to the top plate 48, where they slide along the upward slope, propelled by the flow of stock, and then float to the surface in the central section 44.

The deceleration of the stock means that there is a conversion of the hydraulic energy of velocity head to static head, according to the Bernouilli equation. This means that the stock level in the open-topped central section will be higher than the stock level in the pulper. Therefore the vertical height of the side walls of the central section, at edge 52 for example, must be made higher than the top of the pulper sidewall 16, as shown in FIG. 2. The stock level in the central section is indicated by a level line 68.

In the central section 44, the forward velocity of the stock in the main flow direction, by which is meant along a path from inlet opening 34 to outlet opening 36, will be very greatly reduced, due to the very large cross-sectional area in a direction perpendicular to the flow, extending from the liquid surface at the top to the junk pocket 56 at the bottom. This means that the forces of gravity, and of buoyancy, will operate to drop heavy contaminants into the junk pocket and float light contaminants to the surface.

In the convergent section 46, the stock is accelerated to a higher velocity as the cross-section narrows, and the static head is partly converted back to velocity head, according to the Bernouilli equation. Stock leaves the passageway and re-enters the pulper through opening 36. Since opening 36 is at a higher vertical elevation in the tub wall 16 than the inlet opening 34, it is in a region where the vortical flow is less energetic, being farther from the rotor, and thus offering less resistance to the flow of stock leaving the passageway and re-entering the pulper. Further, the stock is directed to the opening 36 tangentially, directed by the end plate 64, and thus flows along with, rather than being opposed by, the vortical flow in the pulper. Flow through the convergent section 46 is generally depicted by a flow arrow 70.

It may be noted at this point, that, if an entrained contaminant particle, whether a light contaminant or a heavy contaminant remains entrained in the flowing stock throughout the passageway without separating out, and passes through the opening 36 back into the pulper, this is of small concern. As the pulper operation continues, and as flow through the passageway continues, it will once again enter the passageway, sooner or later, and have another opportunity to separate out.

The heavy contaminants which accumulate in the junk pocket 56 are removed from time to time using a clamshell grapple of known design, or an orange-peel grapple of known design, lowered from the top into the junk pocket. An orange-peel grapple is depicted diagrammatically at 72. The grapple, suspended from an overhead electric hoist, may be lowered into the junk pocket with its claws open, then closed to lift out the junk. If the hoist is suspended from a trolley rail, or from a swinging gantry, the grapple can be moved aside to be discharged into any suitable bin or container which can later be trucked away for disposal. Hoist, trolley rail and container are not shown, being well-known, and any suitable design may be used.

The light weight contaminants float to the top, and accumulate at or near the stock surface 68. Conveyor means are provided to remove them, including rollers 74 and 76. Roller 74 is above the water surface, and is driven by a suitable motor and drive, in the sense shown by direction arrow 78. Roller 76 is below the water surface, or stock surface 68. An endless belt 80, of neoprene or other suitable material, and bearing transverse flexible blades 82, is driven at a low linear speed by the roller 74. Light contaminants carried up the conveyor are discharged from a chute or spout 84, as a discharge 86, which may be directed to a bin or container not shown, which may be later trucked to disposal.

One side of the central section 44 is extended upwardly, angled at 88, to conform to the slope of the conveyor.

A shower head 88 controlled by a valve 90 is provided above and to the side of the open top of section 44, at the opposite side to the conveyor. This is supplied with fibre-free water at fairly high pressure and directed in a downwardly angled manner towards the conveyor. It has two functions. First, it tends to move light contaminants floating on or near the surface, across the open top toward the conveyor. Second, it tends to wash good stock and fibre downward, toward the main flow 66–70, and thus eventually back to the pulper.

A similar shower head 92 is supported by any convenient means over the conveyor belt 80, and is controlled by a valve 94. Its purpose is to wash adherent good fibre off the light contaminants as they ascend the conveyor, and wash it back into the main body of liquid in the passageway.

A flush water connection 96 is provided, entering the bottom of the junk pocket 56, controlled by a valve 98. Its purpose is to wash good fibre which may be associated with the junk in the junk pocket upward and into the main flow 66–70, where it will be returned to the pulper.

In continuous pulper operation, where there is provided a continuous inflow of water or whitewater to the pulper, it will be found advantageous to add some or all of the continuous inflow of water through the flush water connection 96.

Figure 3:
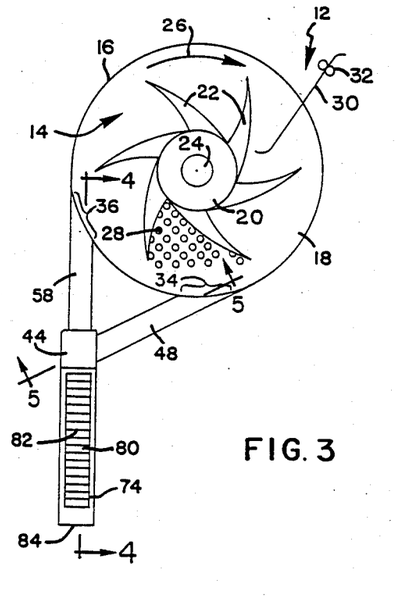
FIG. 3 is a plan view of another embodiment of the invention, which embodiment is suited to the conversion, or retro-fitting of an existing pulper to practise the invention.
Figure 4:
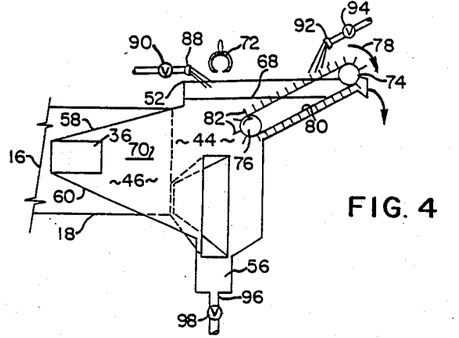
FIG. 4 is a partial vertical section of the embodiment of FIG. 3, taken along the line 4—4 of FIG. 3.
Figure 5:
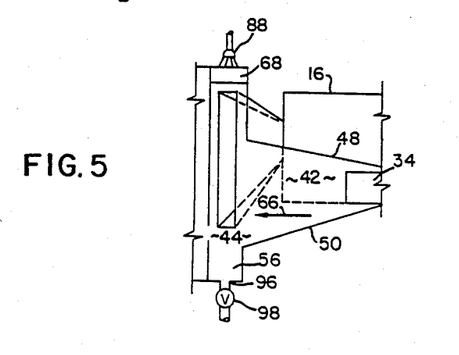
FIG. 5 is another partial vertical section of the embodiment of FIG. 3 taken along the line 5—5 of FIG. 3.

FIGS. 3, 4 and 5 illustrate a second embodiment of the invention. It will be seen from the figures that the passageway 44 is located horizontally away from the cylindrical pulper wall 16. This embodiment is suited for the conversion of an existing pulper installed in a mill to be suitable for practising the method of the present invention. With an existing pulper, it may not be convenient, or even feasible, to make a portion of the pulper wall 16 a common wall with the passageway. This may be because of the construction details of the existing pulper, because of the location and dimensions of a floor or of support structures, or because of the proximity of other equipment. The embodiment of FIGS. 3, 4 and 5 provides a suitable design.

As will be seen in the figures, the divergent section 42 leads to the central section 44, which is supported on any convenient support structure, and then the stock changes direction, flowing along convergent section 46 to opening 36, and thence back to the pulper.

The operating principles, and the flow patterns, are, of course, the same as in the embodiment of FIGS. 1 and 2.

Figures 6, 7:
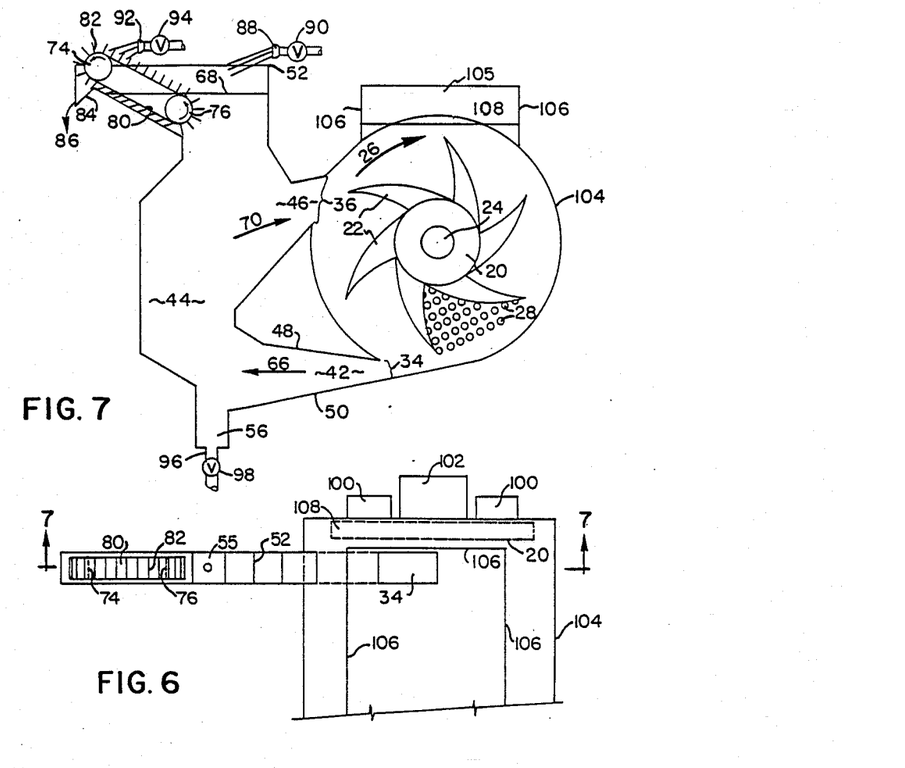
FIG. 6 is a partial plan view of a pulper having a horizontal shaft, incorporating an embodiment of the invention suited for such a pulper.
FIG. 7 is a vertical section of the pulper of the embodiment of FIG. 6, taken along the line 7—7 of FIG. 6.

FIGS. 6 and 7 illustrate yet another embodiment of the invention, in this case suited for a pulper with a horizontal shaft, or, as it is sometimes called, a side-entry pulper.

The pulper of FIGS. 6 and 7 has a rotor 20 rotating in a vertical plane at one end of the pulper tub, with the extraction plates, containing extraction holes 28, also in a vertical plane behind the rotor. FIG. 6 shows diagrammatically, the annular extraction chamber 100 located behind the extraction plates. The bearings supporting the shaft, and the drive for it, are depicted diagrammatically at 102.

The pulper tub wall is in the general form of a cylinder with a horizontal axis. There is a rectangular cut-out portion at the top, leaving the pulper open to atmosphere, but surrounded by a rectangular vertical sidewall 106, extending upwardly a short distance. The rectangular cut-out is not extended right to the end at the rotor end, leaving a shroud portion 108 of the cylindrical wall 104 covering the rotor, to avoid excessive splashing.

The inlet opening 34 is at the bottom of the cylindrical tub, and the outlet opening 36 is located vertically above it. It will be seen from the figures that the converging section 46 is considerably truncated, compared to the shapes of the other embodiments. This geometrical arrangement in this embodiment is made to minimize possible re-entrainment of rising particles of light contaminants in the flow entering or passing through section 46.

The flow patterns and operating principles are very similar to the other embodiments.

Figure 8:
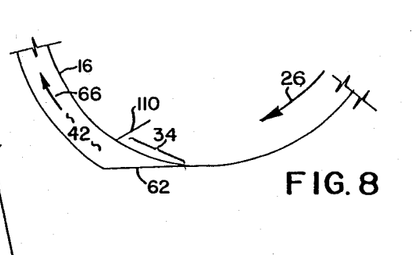
FIG. 8 is a partial horizontal section, showing optional inlet means, taken along line 8—8 of FIG. 2.

FIG. 8 is a partial view in horizontal section of modified inlet means. Deflector plate 110 is rigidly attached by one edge to wall 16, and is located at the downstream edge of opening 34, which is to say downstream with respect to vortical flow depicted by arrow 26. The plate is angled into the flow 26. The effect is to direct more flow of stock into opening 34, since stagnation pressure equivalent, hydrodynamically, to the velocity head of the vortical flow, will be produced where flow 26 impacts the plate. This inlet modification is suitable for any of the disclosed embodiments.

Figure 9:
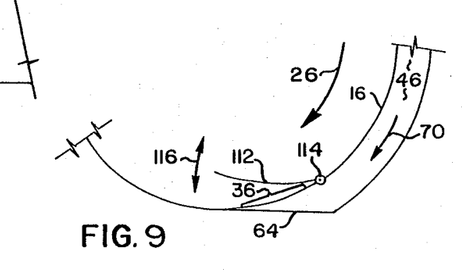
FIG. 9 is a partial horizontal section, showing optional outlet means, taken along the line 9—9 of FIG. 2.

FIG. 9 is a partial view in horizontal section of modified outlet means. A curved plate 112 is provided, with its curvature such as to conform closely to wall 16. It is rotationally mounted on hinge or pivot means 114, with the pivot located at the upstream end of opening 36, that is, upstream with respect to vortical flow 26. Plate 112 may be moved about pivot 114 as shown by double ended arrow 116, by lever means not shown. The lever means may be manually adjusted, or may be fitted with an air cylinder or other means to be remotely moved from the control panel board in the pulper room.

When plate 112 is widely opened, its effect will be to increase and augment flow through the passageway, since a negative stagnation pressure, or, to put it in other words, a reduced static pressure will be produced on the face of plate 112 downstream from vortical flow 26.

When plate 112 is closed against wall 16, it will act as a valve, closing opening 36, and reducing flow through the passageway substantially to zero. The ability to do this is advantageous, in certain circumstances, of which the batch pulping of old corrugated container stock is an example. At the start of the batch pulping cycle, the old corrugated cartons are initially broken down into quite large chunks, afoot or more in extreme dimensions. Of course, as the pulping cycle proceeds, they are broken down to smaller pieces, and eventually defibred to pulp. However, in the first part of the pulping cycle, it is advantageous to be able to close down the passageway, so to speak, to prevent the very large pieces of corrugated cardboard from interfering with flow patterns in the passageway, or perhaps even causing blockage.

Plate 112 may, of course, be opened to intermediate openings, in which case it acts as a throttling valve, adjusting the volume and velocity of flow through the passageway. If, for example, it is found that large amounts of small pieces of styrofoam are being re-entrained in the flow through the passageway, and brought back into the pulper, it will be found advantageous to use plate 112 to reduce the flow rate through the passage, giving more retention time to the stock in the passage, and thus permitting styrofoam particles to rise to the surface.

Plate 112, the associated pivot 114, and the associated lever means may be adapted to any of the embodiments of the invention.

Figure 10:
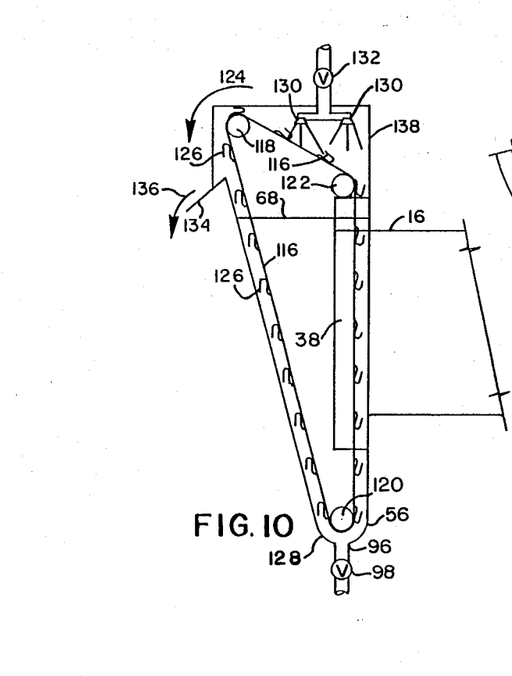
FIG. 10 is a vertical section, taken along line 10—10 of FIG. 1, showing an embodiment of the invention utilizing bucket elevator means to remove heavy contaminants.

FIG. 10 shows an embodiment of the invention in which bucket elevator means are employed to remove settled heavy contaminants from junk pocket 56. A pair of endless chains 116 run over three pairs of sprocket wheels, 118, 120 and 122. Sprocket 118 is driven by a suitable motor and drive, so that the chains move in the direction of the sense arrow 124. The chains carry a plurality of buckets 126. Advantageously, the bottom 128 may be arcuate in form, to conform, with suitable clearance, to the path of the outer lip of a bucket 126 in passing around sprockets 120.

The bottom of the buckets contain a plurality of holes, or the bottom of the buckets may be made of expanded metal mesh, so that any stock contained therein quickly drains out as the bucket rises above the surface 68 of the stock in the passageway. Shower heads 130 controlled by valve 132 are provided over the portion of the bucket run between sprocket pair 122 and sprocket pair 118, to wash any remaining stock away from the heavy contaminants in the bucket back into the passageway.

As they pass over sprocket pair 118, the buckets dump, and the heavy contaminants slide down ramp 134, as depicted by arrow 136, and thus into a bin or container (not shown) which may be trucked away to waste.

Vertically extended sidewalls 138 are advantageously provided, shielding the upper portion of the bucket elevator run, and the showers 130, to avoid splashing.

Other means than those illustrated may be employed for removal of heavy contaminants from the junk pocket, without being outside the scope of the invention. Other means for removal of the light contaminants than the conveyor means disclosed, may also be employed. The sizes, shapes, and geometrical relationships of the various parts may also be widely varied from the embodiments shown, and still conform to the principles of the invention.

I claim:

1. A method of removing contaminants from a rotating main body of liquid containing paper pulp in suspension, said method comprising
   (a) diverting a subsidiary stream of said liquid from said main body,
   (b) expanding the transverse cross-section of said diverted stream to reduce its velocity to cause heavy contaminants in the reduced-velocity stream to sink and light contaminants to rise,
   (c) subsequently contracting the transverse cross-section of the previously expanded stream to increase its velocity, and
   (d) returning such increased-velocity stream to the main body,
   (e) said diverting and returning steps utilising energy from such rotation to induce flow of the subsidiary stream,
   (f) wherein said subsidiary stream flows in a path substantially coaxial with the rotation of the main body.

2. A method according to claim I, wherein said diverting and returning steps take place substantially tangentially of the direction of rotation of the main body.

3. A method according to claim 2, wherein the subsidiary stream is diverted from the main body of liquid at a low level in said body and is returned to the main body at a level higher than said low level.

4. A method according to claim 3, wherein the main body of liquid rotates about a vertical axis.

5. A method according to claim 3, wherein the main body of liquid rotates about a horizontal axis.

6. A method according to claim 1, including removing heavy contaminants from a lower part of the reduced-velocity stream.

7. A method according to claim 1, including removing light contaminants from an upper part of the reduced-velocity stream.

8. A method of removing contaminants from a rotating main body of liquid containing paper pulp in suspension, said method comprising
   (a) diverting a subsidiary stream of said liquid from said main body,
   (b) expanding the transverse cross-section of said diverted stream to reduce its velocity to cause heavy contaminants in the reduced-velocity stream to sink and light contaminants to rise,
   (c) subsequently contracting the transverse cross-section of the previously expanded stream to increase its velocity, and
   (d) returning such increased-velocity stream to the main body,
   (e) wherein said diverting and returning steps take place substantially tangentially of the direction of rotation of the main body whereby to utilise energy from such rotation to provide the sole inducement to flow of the subsidiary stream.

9. A method according to claim 8, wherein the subsidiary stream is diverted from the main body of liquid at a low level in said body and is returned to the main body at a level higher than said low level.

10. A method according to claim 9, wherein the main body of liquid rotates about a vertical axis.

11. A method according to claim 9, wherein the main body of liquid rotates about a horizontal axis.

12. A method according to claim 8, including removing heavy contaminants from a lower part of the reduced-velocity stream.

13. A method according to claim 8, including removing light contaminants from an upper part of the reduced-velocity stream.

* * * * *